(12) United States Patent
Okada et al.

(10) Patent No.: US 6,369,975 B1
(45) Date of Patent: Apr. 9, 2002

(54) DOOR OPENING/CLOSING MECHANISM

(75) Inventors: Tomoyuki Okada; Yuji Kato; Hirofumi Saito; Takahisa Miyamoto, all of Inagi; Akira Takano, Kawasaki, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/535,488

(22) Filed: Mar. 24, 2000

(51) Int. Cl.[7] ............................................... G11B 15/68
(52) U.S. Cl. ........................................ 360/92; 360/96.5
(58) Field of Search ...................... 360/92, 96.5, 97.01, 360/98.05

(56) References Cited

U.S. PATENT DOCUMENTS 4,866,552 A * 9/1989 Nagase ...................... 360/96.5
5,469,310 A * 11/1995 Slocum et al. ................. 360/92
6,160,678 A * 12/2000 Meikle et al. ................. 360/92

* cited by examiner

Primary Examiner—Robert S. Tupper
(74) Attorney, Agent, or Firm—Greer, Burns & Crain, Ltd.

(57) ABSTRACT

In order to reliably lock a door element and detect its state, a pressing unit is mounted to a part of a door element so that it may press in the closing direction independently of the door body, and latch means is mounted to the mating part of the door element so that it may be engaged with a distal end of the pressing unit at a distance less than a predetermined spacing to finely move the door element. A projecting part is mounted to the pressing unit so as to project toward the mating part. The mating part includes resilient means acting to repel a force of the projecting part influenced in the direction of the mating part, and a switching element operable to detect the closing state of the door element when the projecting part presses the resilient means with more than a predetermined pressing force.

3 Claims, 4 Drawing Sheets

DOOR OPENING/CLOSING MECHANISM

BACKGROUND OF THE INVENTION

1. Field of the Invention

The present invention is a technique effectively applied to a door opening/closing mechanism in an autoloading device for a magnetic tape cartridge, etc.

2. Description of the Related Art

This type of door opening/closing mechanism in the prior art is shown in FIG. 6.

FIG. 6 is a structural view showing a door opening/closing mechanism used for an autoloading device for a magnetic tape cartridge, etc. A device body 21 includes a one-way opener type door element 22 which is closed to seal processing space 27 in the device body 21.

In this type of autoloading device, if the door element 22 is opened during the processing, a cartridge loaded in the processing space 27 may be jammed or the order of reading data contained the cartridge may change, to thereby cause any failure on the data processing.

In order to avoid such a failure, the door element 22 must be prevented from opening/closing, and the door element 22 must be reliably locked. Therefore, a mechanism has been required to reliably detect the closing state of the door element 22.

In the prior art, the device body 21 includes a photosensor 25 and microswitch 26 which are used in combination with a first detection flag 23 and a second detection flag 24 which are attached to the door element 22 side for the detection. More specifically, when the door element 22 is closed, first, the detection flag 24 is pressed onto the microswitch 26 to be turned on. Then, this closing state is judged to continue or not depending upon whether or not the photosensor 25 senses the first detection flag 23.

However, since there is a two-step detection mechanism, it may be complicated to identify the closing state, and another lock mechanism with different arrangement is separately required to thereby make the overall structure complicated. In addition, even in the state where the door is not precisely locked (half-opened), the photosensor 25 may possibly sense that the door element 22 is closed.

The present invention has been made in view of the above-stated problems, and it s object is to provide a technique reliable to lock a door element and detect its state.

SUMMARY OF THE INVENTION

According to the present invention, a pressing unit is mounted to a part of a door element so that it may press in the closing direction independent ly of the door body, and latch means is mounted to the mating part of the door element so that it may be engaged with a distal end of the pressing unit at a distance less than a predetermined spacing to finely move the door element. A projecting part projecting toward the mating part is mounted to the pressing unit. The mating part includes resilient means acting to repel a force of the projecting part influenced in the direction of the mating part, and a switching element operable to detect the closed state of the door element when the projecting part presses the resilient means with more than a predetermined pressing force.

With such a switching structure that the door element can be finely moved even in a latched state and detected with more than a predetermined force of pressing a pressing unit, the locking of the door element and the detection mechanism can be functionally separated, thereby making it possible to reliably lock the door element and detect its closed state.

DETAILED DESCRIPTION OF THE PREFERRED EMBODIMENT

The preferred embodiment of the present intention will now be described with reference to the accompanying drawings.

FIGS. 1 to 4 show a door opening/closing mechanism in an autoloading device in accordance with an embodiment of the present invention.

Figure 1:
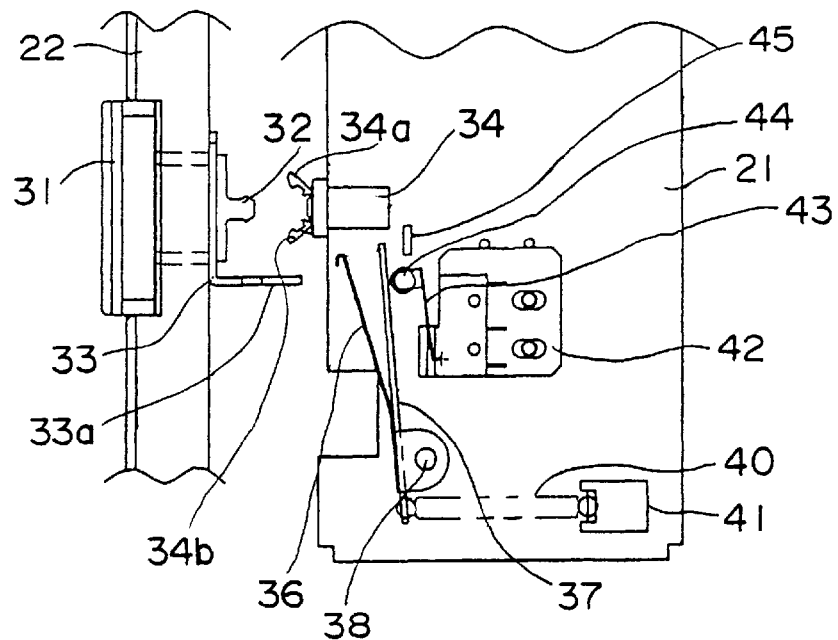
FIG. 1 is a first explanatory diagram showing a door opening/closing mechanism in accordance with one embodiment of the present invention.

A push button 31 (pressing unit) is mounted to a door element 22, which is exposed to the external of the door element 22, so that an operator may operate to press the push button 31 in the direction of the device body 21 (toward the right in FIG. 1). A projecting part 32 operable with the bush button 31 is formed on the surface (the right in this figure) opposite to the surface where the push button 31 is exposed. The projecting part 32 has a proximal portion fixed to the push button 31, an intermediate portion smaller in diameter, and the distal end having a head larger in diameter.

One end of an L-shaped flag plate 33 is fixed to the proximal portion of the projecting part 32, and the other end (distal end 33a) of the flag plate 33 is bent toward the device body 21. When the door element 22 is closed, the distal end 33a of the flag plate 33 is plunged into the device body 21.

In the device body 21, a pair of latch parts 34a and 34b having the distal ends opened and the proximal portions received in a holder 34 is formed in position so as to correspond to the projecting part 32. As the head of the projecting part 32 is plunged, the latch portions 34a and 34b are interlocked therewith and operated for closure to latch the head.

This latched state may be released as the head of the projecting part 32 is pushed into the holder 34. This mechanism may be feasible with a toggle-like cam mechanism in the holder 34.

Figure 3:
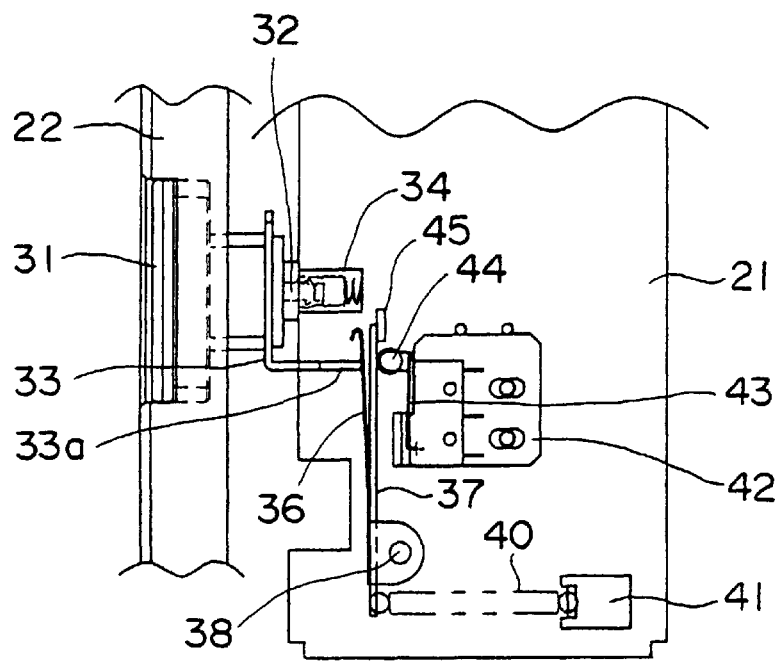
FIG. 3 is a third explanatory diagram showing the door opening/closing mechanism in accordance with the embodiment of the present invention.
Figure 4:
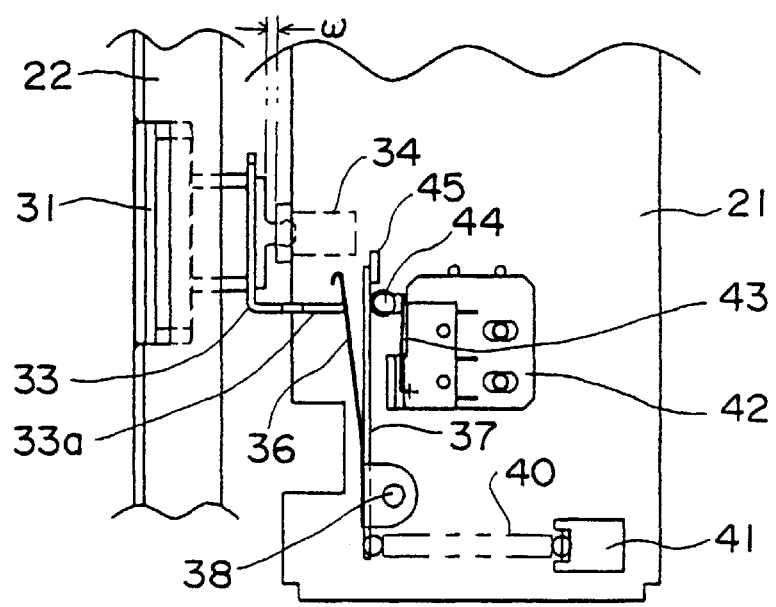
FIG. 4 is a fourth explanatory diagram showing the door opening/closing mechanism in accordance with the embodiment of the present invention.

The latch parts 34a and 34b can be finely moved in a range indicated by "w" in FIG. 4 while the head of the projecting part 32 is latched. If the push button 31 is pressed by an operator and the door element 22 is pushed to the device body 32 side to thereby set the latch parts 34a and 34b in a maximum stroke (see FIG. 3), "w" becomes zero. Once the operator hands off the push button 31, the door element 22 repels the device body 21, causing a distance by "w" as shown in FIG. 4. During these operations (the interval from the state of FIG. 3 to that of FIG. 4), the latched state is kept.

The device body 21 includes a switching bar 37 movable about a pivot portion 38 in correspondence with the distal end 33a of the flag plate 33. The switching bar 37 is engaged to one end of a spring 40 at an extending portion of the pivot portion 38. The other end of the spring 40 is fixed to the device body 21 by a spring stopper 41. Thus, the distal end of the switching bar 37 (opposite to the pivot portion 38) is biased in the counterclockwise direction. A switching bar stopper 45 is disposed above the pivot portion 38 so that the rotation of the switching bar 37 at a predetermined angle or more may be controlled.

Figure 5:
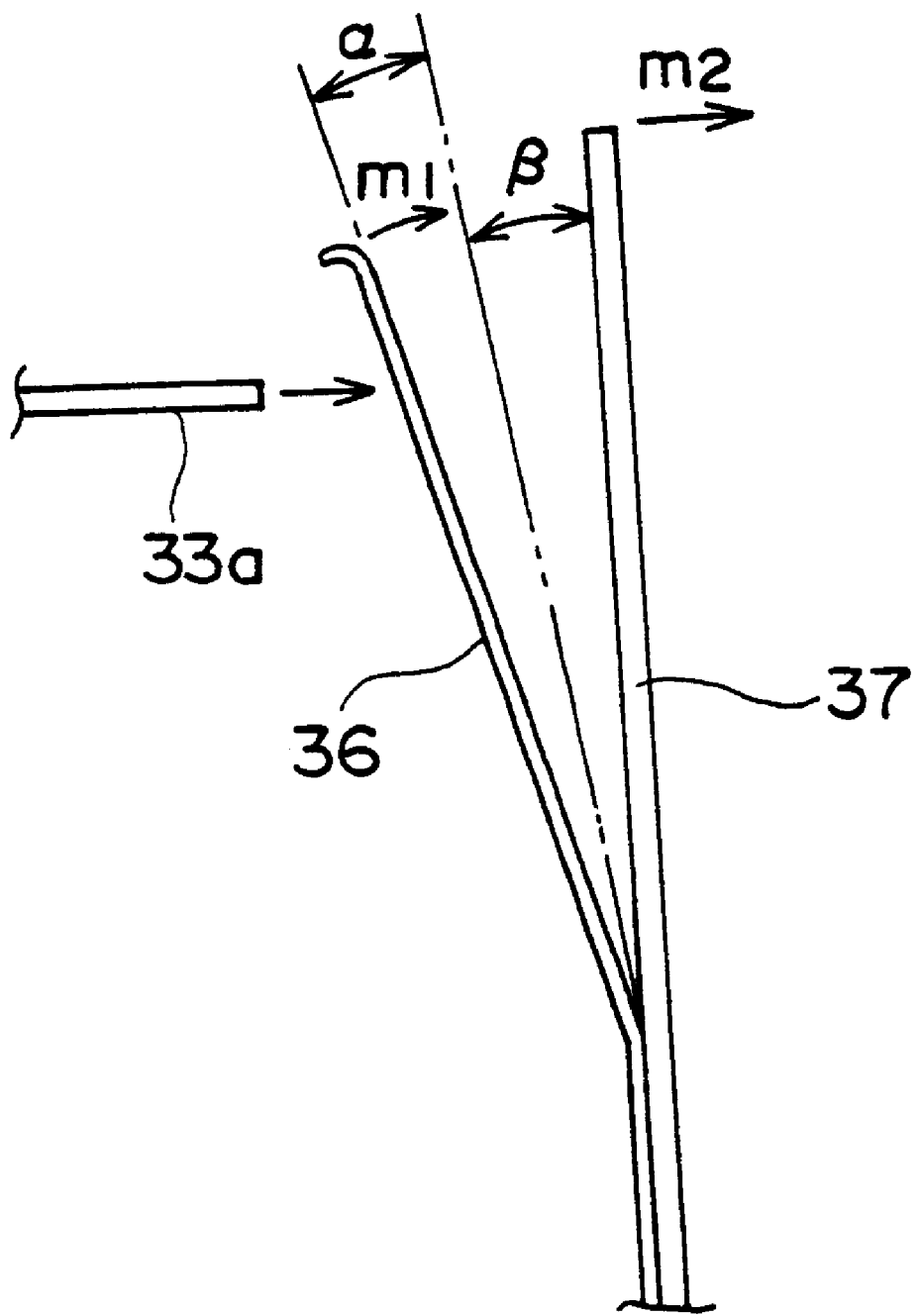
FIG. 5 is an explanatory diagram showing the operation of a flat spring and a switching bar in the embodiment of the present invention.
Figure 6:
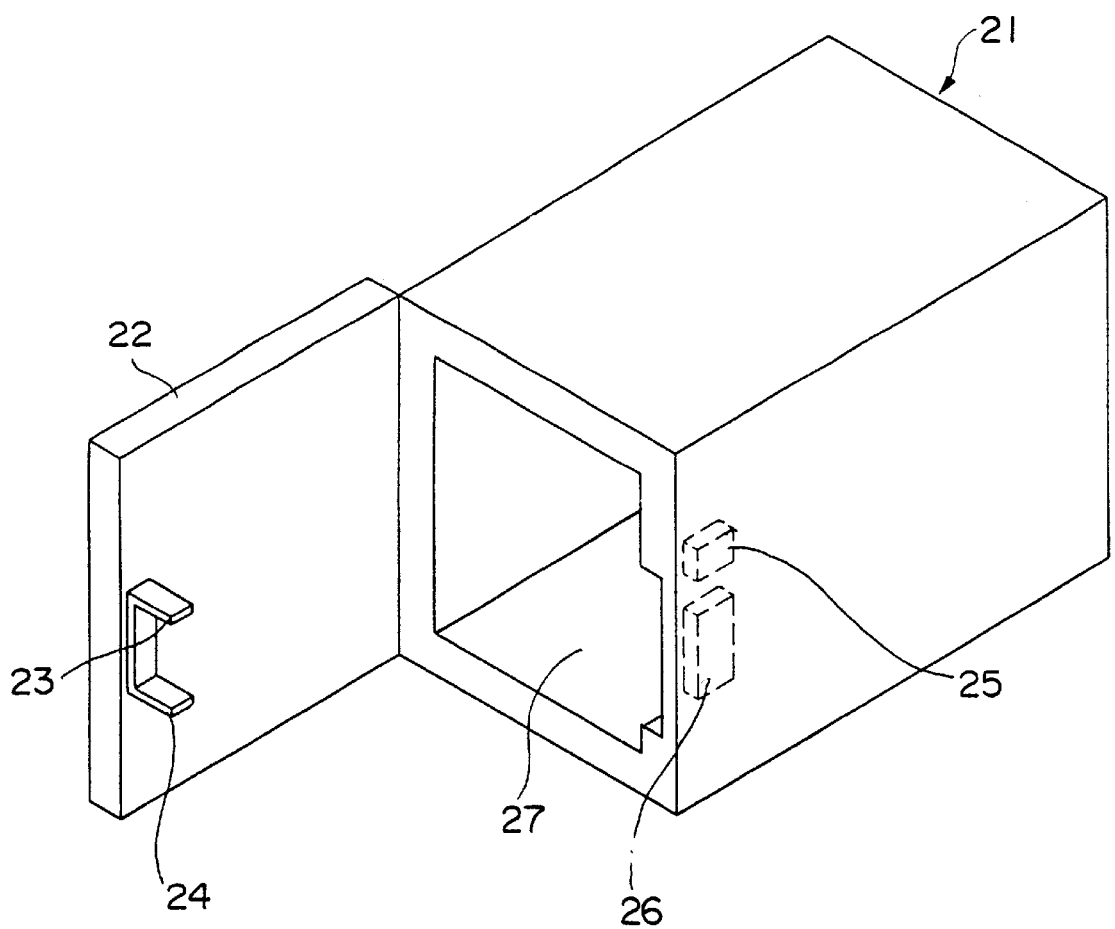
FIG. 6 is an explanatory diagram showing a door opening/closing mechanism in the prior art.

The proximal portion of a flat spring 36 is fixed to the proximal portion of the switching bar 37. The distal end of the flat spring 36 is bent in the counterclockwise direction by a predetermined angle apart from the distal end of the switching bar 37. Under this condition, when the distal end 33a of the flag plate 33 is operated to press (move to the right in the figure), it first abuts the flat spring 36. The flat spring 36 is then resiliently deformed to push the distal end 33a by an angle α as shown in FIG. 5 (as indicated by "$m_1$" in FIG. 5). Now, since the spring 40 more largely resists the biasing force due to the resilient deformation of the flat spring 36, the switching bar 37 is not rotated. However, if the flat spring 36 is further pushed by the distal end 33a and the angle exceeds a range of a, then the spring 40 will not resist it to rotate the switching bar 37 counterclockwise (as indicated by "$m_2$" in FIG. 5).

A microswitch 42 is disposed at the side opposite to the surface facing the flat spring 36 of the switching bar 37, a roller part 44 is provided on the distal end of a contacting element 43, and the roller part 44 is slidingly contacted to the back surface of the switching bar 37.

The microswitch 42 is turned on as the switching bar 37 causes the contacting element 43 to move.

The closing of the door element 22 and its detection in accordance with the present embodiment will now be described.

First, as the push button 31 is pushed to the right as shown in FIG. 1 by an operator, the door element 22 also moves toward the device body 21 (to the right in this figure).

Figure 2:
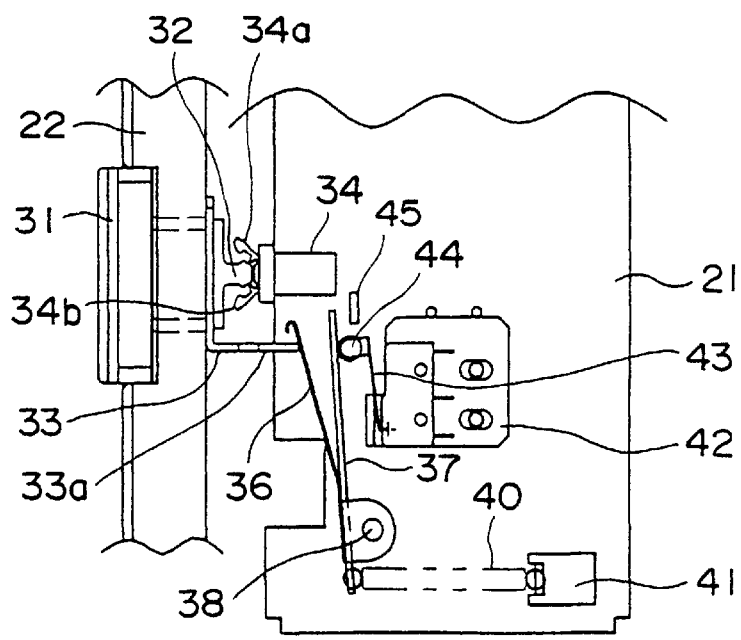
FIG. 2 is a second explanatory diagram showing the door opening/closing mechanism in accordance with the embodiment of the present invention.

Then, the head of the projecting part 32 is inserted into the opened latch parts 34a and 34b, and the latch parts 34a and 34b are then inserted into the holder 34 while holding the head therebetween (see FIGS. 2 and 3).

The distal end 33a of the flag plate 33 is brought into contact with the flat spring 36 due to the pushing operation of the push button 31, thereby forcing the flat spring 36 to be resiliently deformed. If this deformation is performed within the range of angle α, the switching bar 37 with the flat spring 36 is more largely biased by the spring 40 than it is resiliently biased by the flat spring 36, and is therefore still stopped.

If the push button 31 is further pushed and the resilient deformation of the flat spring 36 is beyond the angle range α, the spring 40 does not resist it, and the switching bar 38 starts to be rotated counterclockwise about the pivot portion 38.

The back surface of the switching bar 37 presses the contacting element 43 through the roller part 44 to thereby turn on the microswitch 42. This causes the door element 22 to be closed, which is detected by a control unit (not shown).

FIG. 3 shows the case where the push button 31 is pushed in a maximum stroke. This maximum stroke is controlled by the switching bar stopper 45.

If the operator hands off the push button 31, the resilient force (repellent force) of the flat spring 36 causes the push button 31 and the door element 22 to be retracted to the direction opposite to the device body by "w" as shown in FIG. 4 while the latched state is still kept. However, since the latched state is maintained at this time, the door element 22 may not be opened.

As described above, according to the present embodiment, the latch mechanism (lock mechanism) of the door element 22 and the mechanism of detecting the closed state are separated, and the detecting mechanism includes a buffer (by an angle α) using the resilient deformation of the flat spring 36. This enables the lock mechanism and the detection of closing the door element 22 to be precisely attained with a simple mechanism.

What is claimed is:

1. A door opening/closing mechanism comprising:
   a pressing unit allowing a portion of a door element to be pressed in a closing direction independently of the door element;
   latch means provided on a mating part which is engaged with a distal end of said pressing unit at a distance less than a predetermined spacing to finely move the door element;
   a projecting part fixed to said pressing unit, said projecting part projecting toward the mating part;
   resilient means provided on the mating part which acts to repel a force of said projecting part influenced in a direction of the mating part; and
   a switching element operable to detect a closed state of the door element when said projecting part presses said resilient means with more than a predetermined force.

2. A door opening/closing mechanism as claimed in claim 1, wherein said switching element is a microswitch, including a contacting element disposed on one surface side near a distal end of a detection lever capable of rotating about a fulcrum, another surface side facing said projecting part via a space defined by a distal end of a flat spring serving as said resilient means.

3. A door opening/closing mechanism as claimed in claim 1, wherein the door element and the mating part constitute a portion of an autoloading device casing for loading a cartridge into a magnetic tape drive unit.

* * * * *

UNITED STATES PATENT AND TRADEMARK OFFICE
CERTIFICATE OF CORRECTION

PATENT NO. : 6,369,975 B1
DATED : April 9, 2002
INVENTOR(S) : Okada et al.

It is certified that error appears in the above-identified patent and that said Letters Patent is hereby corrected as shown below:

<u>Title page,</u>
Item [30], Foreign Application Priority Data, add
-- August 4, 1999; (JP)..11-221345 --.

Signed and Sealed this

Fifth Day of November, 2002

Attest:

Attesting Officer

JAMES E. ROGAN
*Director of the United States Patent and Trademark Office*